Figure 1:
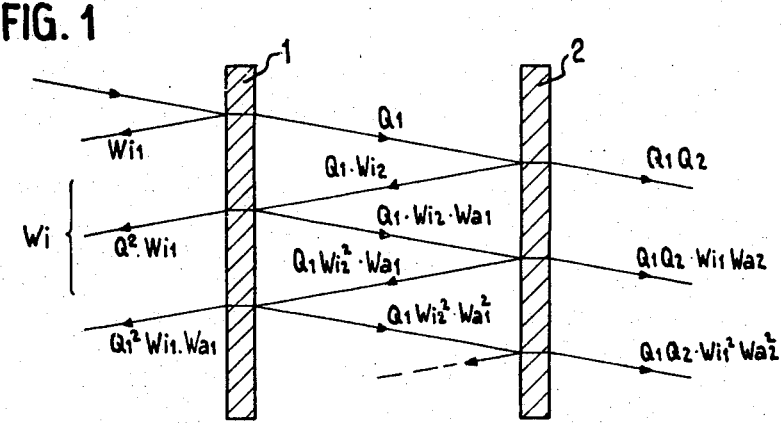

United States Patent

Loos

[15] 3,688,187
[45] Aug. 29, 1972

[54] EDDY CURRENT POSITION TRANSDUCER UTILIZING A COIL WHOSE IMPEDANCE IS MADE SUBSTANTIALLY OHMIC

[72] Inventor: Horst Rudolf Loos, Villars-sur-Glane, Switzerland

[73] Assignee: Vibro-Meter A.G., Freiburg, Switzerland

[22] Filed: June 5, 1970

[21] Appl. No.: 43,848

[30] Foreign Application Priority Data

June 6, 1969 Switzerland...............8632/69

[52] U.S. Cl. ...................324/40, 324/34 PS, 336/45, 340/282
[51] Int. Cl. .............................................G01r 33/00
[58] Field of Search ....324/37, 40, 34; 340/282, 195; 336/179, 30, 45

[56] References Cited

UNITED STATES PATENTS

| | | | |
|---|---|---|---|
| 3,464,002 | 8/1969 | Hentschel | 324/40 |
| 3,362,002 | 1/1968 | Sedak et al. | 324/34 |
| 3,378,763 | 4/1968 | Hastings | 324/40 |
| 3,454,869 | 7/1969 | Strauss et al. | 323/75 |
| 3,541,394 | 11/1970 | Brenneman et al. | 336/179 |
| 3,464,044 | 8/1969 | Strauss | 324/34 |

*Primary Examiner*—Robert J. Corcoran
*Attorney*—Imirie & Smiley

[57] ABSTRACT

A measuring transducer having a measuring coil of which the impedance is variable by eddy currents induced in a conductor variably coupled with the measuring coil, the impedance of the measuring coil being rendered practically ohmic by close and unvariable coupling of the same with another conductor, and the ohmic component only of the measuring coil being considered for measurement.

18 Claims, 14 Drawing Figures

INVENTOR
HORST RUDOLF LOOS

BY
ATTORNEYS

INVENTOR
HORST RUDOLF LOOS

EDDY CURRENT POSITION TRANSDUCER UTILIZING A COIL WHOSE IMPEDANCE IS MADE SUBSTANTIALLY OHMIC

This invention relates to a measuring transducer including at least one measuring coil connected into an alternating-current measuring circuit, said measuring coil being adapted to be influenced in a manner depending on the value to be measured by eddy currents induced by the field of the measuring coil.

Transducers or feelers of this type have been used in the past in increasing number for measurements where the desired variation of an electrical characteristic is possible by interaction of the measuring coil with a structural part of a machine or the like, in which part eddy currents may be induced. Such a part should be of electrically conducting but not necessarily of ferromagnetic material. The principle of these transducers consists in placing an element of electrically conducting material into the magnetic field of the measuring coil. Eddy currents induced in this element produce a counter-field acting back onto the measuring coil, whereby the electrical properties of the coil are changed.

The measuring coils of the above eddy-current transducers as well as those of classical inductive measuring systems have an appreciable ohmic component which may not be neglected. This means that in prior measuring systems wherein the measuring coil is usually connected into a measuring bridge or into a symmetrical voltage-divider circuit, the inductive as well as the ohmic component of the coil impedance have to be considered and balanced. Another drawback of such transducers resides in the relatively high dependence of the impedance from temperature, both components being affected particularly due to the fact that the permeability and conductivity of the materials normally used are subject to appreciable changes under variable temperature conditions. The temperature coefficients of ferromagnetic materials are relatively high. Compensation of such variations due to temperature fluctuations has to be made for both components of the impedance, this being difficult and complicated. Therefore, inductive transducers and eddy-current transducers are often unsuitable for high-precision measurements as set out for instance by Dr. Rohrbach, "Handbuch für elektrisches Messen mechanischer Grössen", Düsseldorf 1967, Page 451, Paragraph G2.3.3.1., such as Page 176.

This invention aims in overcoming the above drawbacks and providing eddy-current transducers of which the impedance has a clearly dominating ohmic component such that in practice the inductive component may be neglected. In this case the transducer may be considered as having the characteristics of an ohmic circuit element. As a result of this, balancing of bridges or symmetrical voltage-divider circuits is much easier and it is of particular interest that compensation of temperature effects is much simpler. In many cases the design of the transducer is substantially simplified. Balancing to equal sensitivity is feasible by means of resistors in a simple manner. By the choice of suitable materials the temperature coefficient of the transducer per se may be improved as compared with that of conventional transducers, whereby compensation is further simplified. In accordance with this invention, these results are obtained by providing a conductor closely and unvariably coupled with the measuring coil such that due to the secondary currents induced in said conductor a predetermined decrease of the inductive component of the coil impedance to a value insignificant compared with the ohmic component of the coil impedance is obtained, the coil impedance being thus practically ohmic, said measuring circuit being adapted for evaluation of the ohmic component of the coil impedance only.

It will be shown below that a decrease of the inductive component and an increase of the ohmic component of the coil impedance is obtained by the close coupling of the measuring coil with a conductor in such a manner that eddy-currents weakening the field of the coil are induced in this conductor. By suitable design of the system the inductive component of the impedance of the measuring coil may be so low compared with the ohmic component that the coil practically acts as an ohmic element, and in any case changes of the inductive component for instance due to temperature varaiations are without disturbing effect. Preferably the conductor closely and unvariably coupled with the measuring coil is a short-circuiting conductor or a screening, for instance a tube enclosing the measuring coil or a coil body of conducting material, but a second coil may also be provided coupled with the measuring coil and loaded by a resistor.

This invention will now be explained in further detail with reference to the accompanying drawing illustrating by way of example a number of embodiments of the transducer.

Figure 2:
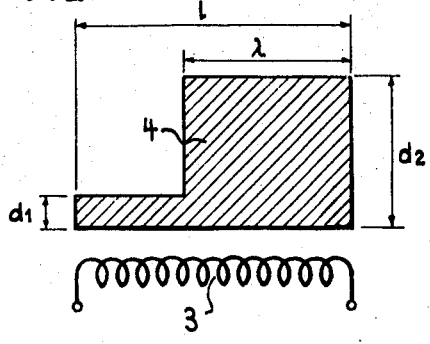
Figure 3:
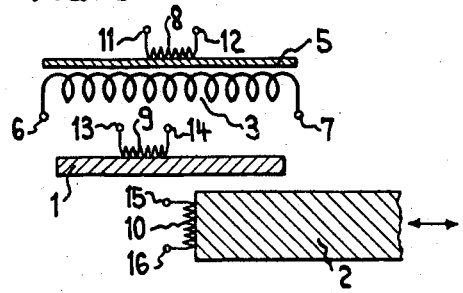
Figure 3:
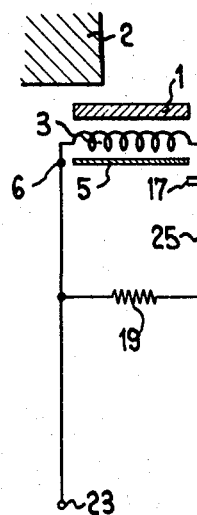
Figure 4:
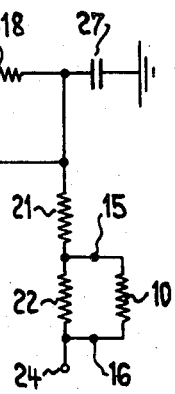
Figure 5A:
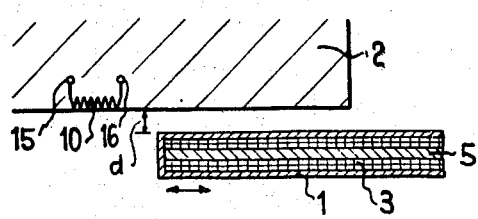
Figure 5B:
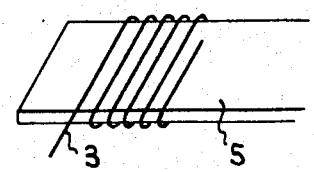
Figure 6A:
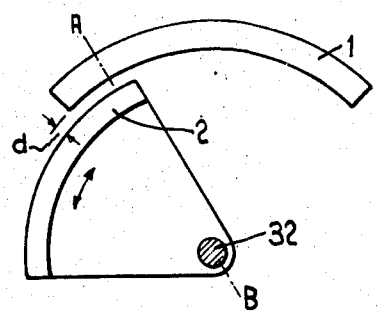
Figure 6B:
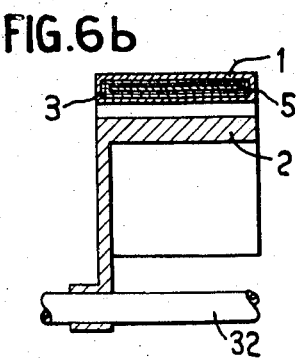
Figure 7:
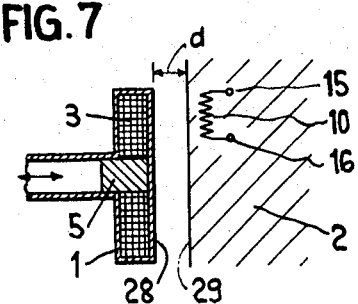
Figure 8:
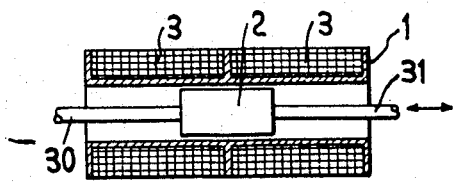
Figure 9:
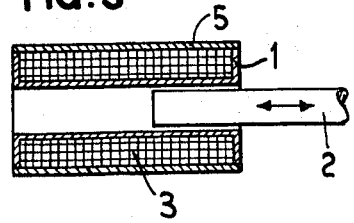
Figure 10:
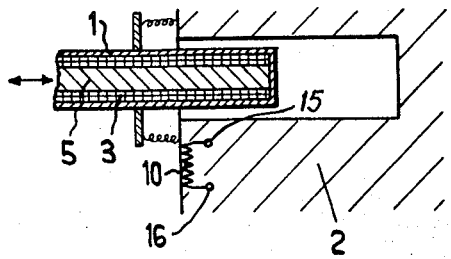
Figure 11:
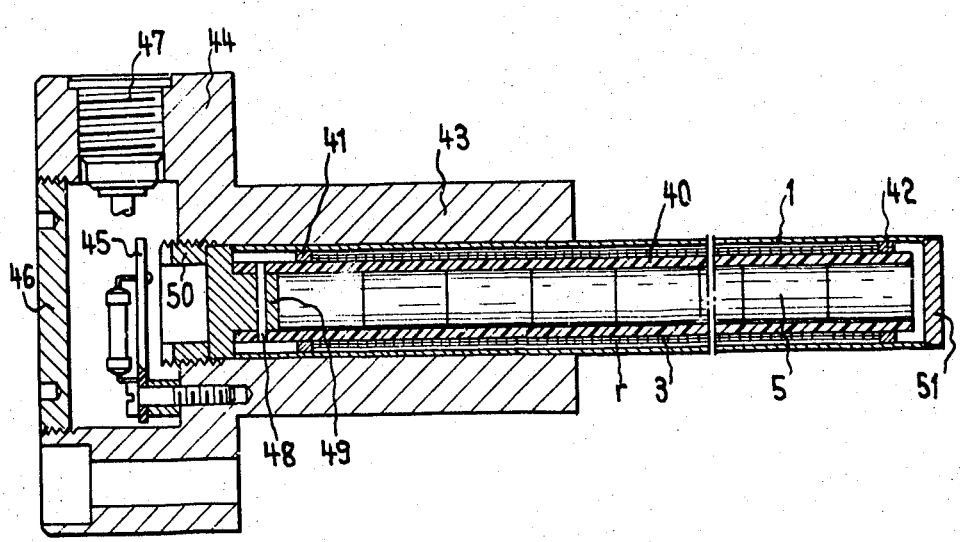
Figure 12:
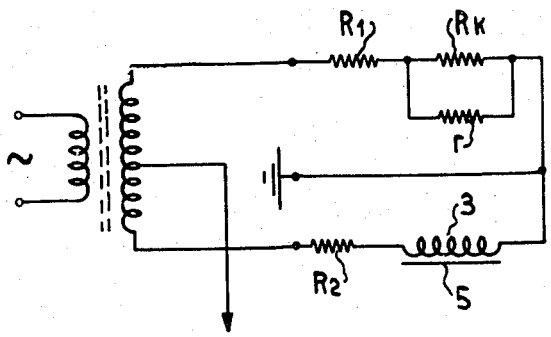

FIG. 1 illustrates the physical interaction of magnetic fields induced by the measuring coil and eddy-currents in two conducting elements, FIG. 2 is a schematic illustration for explaining the screening effect from which the operation of the measuring transducers based on this principle is seen, FIG. 3 is a schematic illustration of a practical embodiment with means for temperature compensation, FIG. 4 illustrates connection of the measuring coil and of the compensating resistors into a bridge circuit, FIGS. 5a and 5b shows the schematic construction of a transducer for measurement of long strokes, FIGS. 6a and 6b is a transducer for angular measurement based on the same conception, FIG. 7 is a transducer for measuring small strokes, FIG. 8 shows a symmetrical transducer with displaceable armature for measurement of medium strokes, FIG. 9 is an asymmetric transducer based on the same principle as the transducer of FIG. 8, FIG. 10 shows a further transducer, FIG. 11 shows an embodiment similar to the one of FIG. 10 in detail and FIG. 12 is a diagram of a circuit suitable for use with the transducer of FIG. 11.

It is generally known that the impedance of a coil is influenced by a screening. Eddy-currents are induced in the screening by the magnetic field of the coil, such eddy-currents producing a magnetic field interferring with and weakening the field of the coil. This physical fact is summarized by the law of Lenz. The inductivity of the coil is reduced. The possible case, where the inductivity of the coil is increased by a ferromagnetic screening material is of no interest in the present case.

Since the screening material has a minimum resistance, losses occur therein due to the eddy-currents, whereby the ohmic component of the coil impedance is increased.

The system formed by a coil and a screening material may be compared with a transformer. The load of the transformer is formed by the resistance of the conducting screening medium. Considering the coil as a primary winding and the screen as a secondary winding of a transformer the relation between load and reaction may be expressed by the transformer equation:

$$\bar{Z} = \bar{R}_1 + \frac{\omega^2 M^2}{\bar{R}_2} \quad (1)$$

with $$\bar{R}_1 = R_1 + j\omega L_1, \quad \bar{R}_2 = R_2 + j\omega L_2, \quad M^2 = k^2 L_1 L_2$$

wherein $L_1$, $L_2$ are the inductivities of the coil and of the conducting screening medium respectively $R_1$, $R_2$ are the ohmic components of the coil and of the screening medium respectively $k$ is the coupling factor between the coil and the conducting screening material From this the coil impedance is:

$$\bar{Z} = R_1 + j\omega L_1 + \frac{k^2 \frac{L_1}{L_2} R_2}{1 + \frac{R_2^2}{\omega^2 L_2^2}} - j\omega \frac{k^2 L_1}{1 + \frac{R_2^2}{\omega^2 L_2^2}} \quad (2)$$

From formula 2) the reduction of the inductivity and the increase of the ohmic component are clearly seen. It may also be seen that by proper mechanical design and choice of suitable materials the changes of the electrical properties of the coil may appreciably be influenced in such a manner that the value of the inductive component becomes insignificant compared with the value of the ohmic component.

According to this invention two conductors are located in the field of the measuring coil the relative position of such conductors being changed in accordance with the value to be measured. In this case the effect of a double screening is obtained. The interaction between these conductors may be illustrated as shown in FIG. 1. In the field of a coil, mathematically expressed by a magnetic dipole, conductors 1 and 2 interact in a particular manner. A reaction field is induced by the field of the coil due to eddy-currents in conductor 1, the intensity of this reaction field being expressed by a factor $W_{i1}$. Index i means that it is a reaction directed inwardly, whereby inwardly means towards the coil. In other words, a part of the coil field is reflected at the inner surface of conductor 1. Another portion of this field passes through conductor 1 and is thereby weakened by a screening factor $Q_1$, whereby it remains in the form of the original field. The remaining field interacts with conductor 2, whereby a portion is reflected, this being expressed by the reaction factor $W_{i2}$. The remaining field passes through conductor 2 weakened by a screening factor $Q_2$. The field portion reflected at the inner surface of conductor 2 is directed towards the outer surface of conductor 1, whereby again a portion of this partial field passes through conductor 1 and a portion is reflected back towards conductor 2. If the initial coil field is a dipole field, this being so for most practical cases, all fields directed outwardly are dipole fields and the inwardly directed fields are homogenous. The portions reflected outwardly are defined by an "outer reaction factor" characterized in the following formula by an index $a$. The mathematical treatment of the above effects results in the following formula for the inner reaction factor:

$$W_{i(\text{total})} = W_{i1} + W_{i2} \frac{Q_1^2}{1 - W_{i2} \cdot W_{a1}} \quad (3)$$

wherein $Q_1$: screening factor of conductor 1

$W_{i1}$, $W_{i2}$: inner reaction factors of conductors 1 and 2 resp.

$W_{a1}$: outer reaction factor of conductor 1.

Since the reaction factors of conductors 1 and 2 depend on the position of such conductors, relatively to the coil, generally speaking on the mechanical configuration of the system, a relative displacement of conductors 1 and 2 necessarily changes the total reaction factor and thus the impedance of the coil. According to this invention, the inductive component of the impedance should become insignificant compared with the ohmic component, this being achieved substantially by conductor 1, for instance by a screening mantle surrounding the coil. Conductor 2 usually causes only a change of the ohmic component of the coil. These conditions may also be explained as follows with reference to FIG. 2: A measuring coil 3 has a length 1. The screening 4 is formed by a medium having a thickness $d_1$ in a range $1-\lambda$ and a thickness $d_2$ in a range $\lambda$. The increase of coil resistance per unit of length is assumed to be $\Delta R_1$ for the thickness $d_1$ and $\Delta R_2$ for the thickness $d_2$. The increase of resistance $\Delta R$ may then by approximated as follows:

$$\Delta R = \Delta R_1 (1 - \lambda) + \Delta R_2 \cdot 1 - \lambda (\Delta R_1 - \Delta R_2) \quad (4)$$

The increase of resistance is a linear function of the lengths $\lambda$ and $1 - \lambda$.

Temperature sensitivity of the device is caused substantially by the following factors:

1. temperature sensitivity of the conductance of conductor 1.

2. temperature sensitivity of the conductance of conductor 2.

3. temperature sensitivity of the resistance of the measuring coil, that is of the coil wire.

4. when a ferromagnetic coil core is used, the temperature sensitivity of permeability and of the conductivity of the core material.

Since the specific resistance of metals increases with increasing temperature, the resistance of the coil wire increases with the temperature. Compensation may be effected by applying temperature sensitive compensating resistors on conductors 1 and 2 and on the core of the coil, if any, such compensating resistors being suitably connected into the measuring circuit, for instance as schematically indicated in FIG. 3. The measuring feeler comprises a coil 3 with a ferromagnetic core 5. Conductors 1 and 2 are located in the magnetic field of coil 3, the relative position of conductors 1 and 2 being changed by the value to be measured. To this end, conductor 2 may be displaced in a direction indicated by an arrow. In this case a mechanical displacement is measured whereby shifting of conductor 2 may be effected by a force acting on an elastic measuring system. As mentioned above, the resulting inductive component of the coil impedance should be insignificant compared with the ohmic component. With increasing temperature the resistance of the transducer as measured between terminals 6 and 7 increases. For compensation, temperature sensitive resistors 8, 9 and 10 having terminals 11—12, 13—14 and 15—16 are applied to core 5 and conductors 1 and 2. As an example, nickel wire may be wound onto plastic foils which are directly cemented to elements 1, 2 and 5. It should be born in mind that the sensitivity of the transducer, that is, the ratio between the maximum change of resistance of the system and maximum relative displacement of conductors 1 and 2 also depends on the temperature. Usually the sensitivity decreases with increasing temperature, particularly in function of the temperature of conductor 2, that is of the "outer" conductor. In this case an negative-temperature-coefficient-compensating resistor may be used which is properly connected into the measuring circuit. FIG. 4 illustrates an example of a satisfactory circuit. The measuring coil and a condenser 17 form the one branch, and elements 8, 9, 18 and 27 the second branch of the one bridge arm. The second bridge arm is formed by resistors 19 and 20. The inductive component of the measuring coil is insignificant compared with the ohmic component. Practically $$\frac{L}{R} = \frac{1}{10} \text{ to } \frac{1}{20}$$

By the series connection of capacitor 17 the value of which is in no way critical, with coil 3, the inductive component of this bridge branch is further reduced. Resistors 8 and 9 are the compensating resistors. In order to obtain a desired value of the resistance in the second bridge branch, resistor 18 is series connected. The values of all resistors are so selected that the desired temperature coefficient of the second bridge branch equal to the temperature coefficient of the coil is obtained. The measuring coil has a capacity against earth which is compensated by a condenser 27 in the second bridge branch. The resistor 10 attached to conductor 2 is connected into the power input circuit having terminals 23 and 24 of the bridge together with other resistors 21 and 22 allowing adjustment of the compensating effect of resistor 10 on the temperature coefficient of the sensitivity of the system. The measuring signal appears at output terminals 25 and 26.

The temperature coefficient of the wire of the measuring coil 3 may substantially be reduced by the use of resistance wire, whereby the quality factor of the coil is further decreased.

FIGS. 5a and 5b schematically shows a transducer for measuring substantial displacement up to several decimeters. The transducer has a flat cross section. It has a metallic casing forming conductor 1. By shifting in the direction of the arrow it is brought more or less within range of conductor 2 which may be constituted by a machine part. As an example, the transducer may be shifted into a slit of a metallic machine part. The distance between conductors 1 and 2 is constant. The coil 3 is wound onto a ferromagnetic flat core 5. Preferably a ferrite material is used having a small temperature coefficient of permeability in the order of $10^{-6}$ to $10^{-5}$. Under these circumstances the influence of temperature changes on the core may practically be neglected. For conductor 1 constituting the casing of the transducer, a non-magnetic material having a specific resistance as high as possible and a small temperature coefficient of the resistance in the order of $10^{-5}$ is used, for instance a Ni-Cr-Fe alloy. In many applications temperature compensation is unnecessary. If undue temperature sensitivity is caused by conductor 2 a resistor 10 has to be applied in a suitable place of conductor 2 and should be connected into the circuit as shown in FIG. 4.

FIGS. 6a and 6b illustrate a transducer for rotating movement. The segmentshaped coil wound of resistance wire on a ferromagnetic core is accommodated in a casing formed by conductor 1. Medium 2 which is mounted on a shaft 32, may be turned more or less within reach of casing 1 and of the measuring coil respectively.

FIG. 7 shows another modification for measuring small displacements. This transducer has a flat coil 3 wound on a ferromagnetic core 5 and enclosed in a metallic casing 1. This transducer may be shifted in the direction of the arrow towards or away from conductor 2, whereby the distance of the efficient surface 28 of the measuring feeler from the surface 29 of conductor 2 changes. Compensation may be effected by means of resistor 10, if necessary.

As illustrated by FIGS. 8 and 9, transducers similar to the conventional plunger transducers may be used. FIG. 8 shows a differential transducer for measuring displacements of medium stroke up to several millimeters. Conductor 1 forms a coil body whereon two symmetrical coils 3 of resistance wire are wound. Conductor 2 has the form of a displaceable core or plunger with actuating rods 30 and 31. The same material having high specific resistance and a low temperature coefficient of resistance is used for both conductors. FIG. 9 shows an asymmetric modification of this transducer allowing measurement of longer strokes of the displacement to be measured. The transducer is enclosed by a ferromagnetic mantle 5.

FIG. 10 illustrates an embodiment having a ferromagnetic core 5 and a coil 3 of resistance wire wound thereon. This coil system is enclosed by conductor 1 and extends into a bore in conductor 2. Resistor 10 may be provided for temperature compensation, if required.

It was found that conductor 1 is preferably made of a material of low conductivity, such as constantan, while conductor 2 is made of a material of high conductivity, such as copper or aluminum. If a bore is provided in a machine part, as shown by way of example in FIG. 10, into which the measuring coil is introduced, this bore may be coated with a metal sheet of high conductivity.

Practical experiments have shown that a coil having an ohmic and inductive component of impedance in the order of 100 ohms each when not influenced by conductors 1 and 2, has an ohmic component of about 1,000 ohms and an inductive component of about 40 to 50 ohms when influenced by the conductors. According to the relative position of the conductors the ohmic component reached a minimum value of about 900 ohms.

FIGS. 11 and 12 illustrate another practical embodiment. The same designation is used for corresponding parts as in FIGS. 1 to 10. The measuring coil 3 is wound on a tube 40 of reinforced plastic material. Tube 40 has an external diameter of 14 mm. Ferromagnetic cores 5 are cemented into the tube. The coil 3 is wound between collars 41 and 42 fixed on tube 40, whereby the coil ends are attached to such collars.

The measuring coil 3 is accommodated in a tube 1 of Inconel Alloy 600 closed at its free end and made of a non-magnetizable alloy with 76% Ni, 15% Cr and 5% Fe sold by H. Wiggin & Co. Ltd. Hereford, England. The tube has an outer diameter of 20 mm and a wall thickness of 1 mm. It offers good mechanical protection of the measuring coil and forms the electrical screening of the coil. The alloy has a specific resistance of $103.10^{-6}$ $\Omega$cm and a temperature coefficient of $13.10^{-5}$. Tube 1 is soldered into the neck 43 of a transducer head 44. Parts 43 and 44 may be made of an easily workable stainless unmagnetic steel. Circuit elements of the half measuring bridge shown in FIG. 12 are mounted on a carrier plate 45 in a recess of the transducer head, this recess being closed by a cover 46. The transducer head has a plug 47 for connection of a measuring cable.

Tube 40 is fixed to a base 49 by means of a pin 48, the flange of base 49 being clamped between tube 1 and an annular nut 50. The space between coil 3 and tube 1 and the recess of the transducer head 44 are filled with plastic material not shown in the drawing, such as araldit. The cover 51 of tube 1 is also made of Inconel alloy 600 and is welded to tube 1. The physical properties of cores 5 should be as independent from temperature changes as possible, and ferroxcube 4B1 is preferably used having the following values:

| | |
|---|---|
| initial permeability at 20° C | 250 |
| TC of initial permeability | $\leq 8.10^{-4}$ |
| specific resistance | $\geq 10^5 \Omega$cm |
| Curiepoint | $= 250°$ C. |

Since the resistance of the measuring coil 3 should not change with temperature, a resistance wire such as Manganin having a diameter of 0.2 mm is used. This material has a temperature coefficient of resistance of $10^{-5}$. Since the measuring coil should be a practically ohmic element, the high specific resistance of manganin of $420 \cdot 10^{-6}$ $\Omega$cm is an advantage.

Measured at a frequency of 8 kHz the measuring coil has the following values:

| | | |
|---|---|---|
| Inductive resistance: | $\|R_L\|$ | $= 32\Omega$ |
| Ohmic resistance: | R | $= 480\Omega$ |

The quality factor of the coil $$Q = \frac{|R_L|}{R}$$

is very low, and therefore the measuring coil may be considered as being a quasiohmic element. Q should not exceed an upper limit value of 0.1 in order to obtain the desired results. High-ohmic or low-ohmic elements may be used provided that Q is maintained below the above limit.

If the transducer shown in FIG. 11 is introduced into a bore of a metallic part as illustrated in FIG. 10, this part forms a second screening. Since the magnetic field of coil 3 is not completely absorbed by tube 1, an interaction occurs as set out above between the coil and the outer screening whereby the ohmic and inductive component of the coil impedance is changed. The system is so designed that the components are not changed by more than 20 percent from the original value they have without outer screening. In the embodiment of FIG. 11 the ohmic component is reduced by about 18 percent while the inductive component is increased to a value which is still smaller than 10 percent of the original value of the ohmic component.

When producing a transducer as shown in FIG. 11, the following rules should be followed:

1. The winding of the measuring coil should be as near as possible to the wall of tube 1 in order to reduce as much as possible the Q-factor of the measuring coil.

2. The wall thickness of tube 1 should be one to three times the equivalent conducting layer $\delta$ for the selected material.

$$\delta = \frac{10^2}{2\pi} 2 \sqrt{\frac{\rho}{f \cdot \frac{\mu}{\mu_0}}}$$

wherein
 $f$: frequency in kHz
 $\rho$: specific resistance in $\Omega$mm$^2$/m
 $\lambda/\lambda_o$: relative permeability The material of tube 1 should not be magnetizable in order that the equivalent conducting layer is not too small.

3. The material of the measuring body (of the outer conductor or screening should have a low specific resistance in order to produce efficient reaction onto the measuring coil. This measuring body may be made of magnetizable material, but this is not an essential condition.

When the above rules (1) to (3) are properly followed a quasiohmic measuring coil is obtained.

The measuring coil 3 of the transducer of FIG. 11 is preferably connected into a bridge measuring circuit as shown in FIG. 12. Elements R1, R2 and Rk are mounted on plate 45 in the transducer head 44. A resistor r is bifilarly wound directly onto the measuring coil 3 and is fixed thereon by the sealing compound of plastic material cast between the measuring coil 3 and tube 1. Even though all materials are carefully selected, the transducer has a temperature coefficient in the order of 0.5 to 1%/° C. This coefficient may be reduced by the use of a temperature sensitive compensating resistor r connected into the second bridge branch. This resistor r is wound of nickel wire having a diameter of 0.1 mm and a high specific resistance of $7.10^{-6}$ $\Omega$cm and a high temperature coefficient of $6,7.10^{-3}$. Resistor r has a value of 200 $\Omega$. For fully balancing the compensating effect a resistor Rk is connected in parallel with r. In order to obtain a high linearity of the measuring system a resistor R2 is series connected with the measuring coil 3, this resistor being so designed that the maximum deviation of the total ohmic component in this bridge branch is about 5 percent of the value for zero position of the measuring system. By means of R1 the resistance of the other bridge branch is balanced. With the above compensation temperature coefficients in the order of 0.1%/° C are obtained.

What is claimed:

1. An eddy current transducer system for measuring positions of a coil with respect to a relatively movable conductor, comprising in combination: at least one measuring coil connected into and energized by an alternating current measuring circuit for measurement of the coil impedence and; a first conductor of highly resistive material positioned closely adjacent said coil and unvariably coupled with said coil whereby the eddy currents induced in said conductor by said coil cause the impedance of said coil to be substantially ohmic, said measuring circuit including ohmic components and being adapted only for measurement of the ohmic component of the coil impedance and a second conductor comprising said relatively movable conductor coupled with said measuring coil.

2. A transducer according to claim 1 wherein said first conductor is disposed between said measuring coil and said second conductor.

3. A transducer according to claim 2, wherein said first conductor consists of a material having lower conductivity than said second conductor.

4. A transducer according to claim 1, wherein said measuring coil is sound from resistance wire.

5. A transducer according to claim 1, wherein said conductors are metal cylinders positioned coaxially to said measuring coil.

6. A transducer according to claim 5, wherein said first conductor is a casing for the measuring coil.

7. A transducer according to claim 1, wherein said conductors are elastically connected to each other and are adapted for relative displacement by forces or motions to be measured.

8. A transducer according to claim 1, wherein said measuring circuit is a measuring bridge, the measuring coil being connected into the one branch of said measuring bridge, the remaining branches of the bridge comprising resistors.

9. A transducer according to claims 1, wherein a condenser is connected in series with the measuring coil.

10. A transducer according to claim 1, wherein temperature-sensitive compensating resistors are applied to at least one of said conductors, said compensating resistors being connected into the measuring circuit.

11. A transducer according to claim 1, wherein said measuring coil has a quality factor $Q = L/R$ of not more than 0.1.

12. A transducer according to claim 10, wherein said measuring coil has a winding body, and a compensating resistor having a high temperature coefficient is applied in bifilar winding to the same winding body as of said measuring coil.

13. A transducer according to claim 12, wherein said measuring coil and compensating resistor are connected into neighboring bridge branches connected to the same output terminal of a bridge.

14. A transducer according to claim 5, wherein said first conductor has a wall thickness in the order of 1 to 3 times the equivalent conducting layer.

15. A transducer according to claim 5, wherein said first conductor is a winding carrier for the measuring coil.

16. A transducer according to claim 1, wherein said measuring coil has a core, a temperature-sensitive compensating resistor being applied to said core.

17. A transducer according to claim 16, wherein compensating resistors are applied to said first conductor and to said coil core and are connected into a bridge branch, and a compensating resistor is applied to said second conductor and is connected into the power input circuit of the bridge.

18. A transducer according to claim 10, wherein said measuring coil has a core, a first compensating resistor being applied to said first conductor and a second compensating resistor being applied to said coil core, said first and second compensating resistors being connected into the same bridge circuit, and wherein a third compensating resistor is applied to said second conductor and is connected into the power input circuit of said bridge.

* * * * *